United States Patent
Takai

[11] Patent Number: 6,010,786
[45] Date of Patent: Jan. 4, 2000

[54] POLYPROPYLENE FIBER FOR REINFORCING CEMENT

[75] Inventor: Yousuke Takai, Hyogo-ken, Japan

[73] Assignee: Daiwabo Create Co., Ltd., Osaka, Japan

[21] Appl. No.: 08/250,658

[22] Filed: May 27, 1994

Related U.S. Application Data

[63] Continuation of application No. 07/936,000, Aug. 27, 1992, abandoned.

[30] Foreign Application Priority Data

Oct. 1, 1991 [JP] Japan ................................. 3-282268

[51] Int. Cl.$^7$ ........................................ D02G 3/00
[52] U.S. Cl. ......................... 428/364; 428/370; 428/375
[58] Field of Search .................... 428/364, 370, 428/375; 252/8.9; 106/644, 711; 524/25, 26

[56] References Cited

U.S. PATENT DOCUMENTS

| | | | |
|---|---|---|---|
| 3,148,232 | 9/1964 | Scheyer . | |
| 3,814,561 | 6/1974 | Matsui et al. | 264/171 |
| 4,306,911 | 12/1981 | Gordon et al. | 106/644 |
| 4,545,949 | 10/1985 | Lange | 264/170 |
| 4,969,956 | 11/1990 | Koike et al. | 106/22 |
| 5,009,651 | 4/1991 | Kamishioiri et al. | 604/378 |
| 5,061,384 | 10/1991 | Suzuki et al. | 252/8.9 |
| 5,338,357 | 8/1994 | Takai et al. | 106/724 |

FOREIGN PATENT DOCUMENTS

| | | |
|---|---|---|
| A-0 081 265 | 6/1983 | European Pat. Off. . |
| A-0 225 036 | 6/1987 | European Pat. Off. . |
| A- 0 343 148 | 11/1989 | European Pat. Off. . |
| A-2 448 516 | 9/1980 | France . |

*Primary Examiner*—Newton Edwards
*Attorney, Agent, or Firm*—Morrison & Foerster LLP

[57] ABSTRACT

Cement articles, having excellent bending strength and Charpy impact strength, are manufactured with an extremely strong polypropylene fiber having good dispersion. The extremely strong fiber which is made of the polypropylene fiber has a narrow molecular weight distribution and a high stereoregularity and is drawn at a high temperture and treated with normal alkylphosphate alkaline metal salt. The extremely strong polypropylene fiber is a drawn thread of highly crystalline polypropylene having $Q<5$, $97<HI<100$, $94<IPF<100$, with Q being the ratio of weight average molecular weight to number-average molecular weight, HI being the insoluble content of boiling n-heptane in wt % and IPF being the isotactic pentad fraction in mol %. The fiber comprises from 0.05% to 10 wt % of alkylphosphate alkaline metal salt and has strong breakage strength, greater than 6 g/denier.

9 Claims, 3 Drawing Sheets

POLYPROPYLENE FIBER FOR REINFORCING CEMENT

This application is a continuation of U.S. application Ser. No. 07/936,000 filed Aug. 27, 1992, now abandoned.

FIELD OF THE INVENTION

This invention relates to an extremely strong reinforcing cement which is uniformly dispersed in a cement slurry without having floating fibres and also has excellent sedimentation in the cement slurry.

BACKGROUND OF THE INVENTION

Asbestos has been used as a reinforcing fibre for cement which is excellent in such qualities as mechanical strength and is inexpensive. However, various kinds of inorganic fibres and synthetic fibres have been proposed which can be substituted for asbestos in reinforcing cement. This is advantageous since asbestos has caused many environmental problems.

For example, the use of glass fibres, polyester fibres, polypropylene fibres, aromatic polyamide, and acrylic fibres were disclosed in Japnese Patent Laid Open Sho (Tokkaisho)No.49-98424 (1974), No.49-104917 (1974), No.49-104918 (1974), No.61-86452 (1986), No.62-171952 (1987). In general, the structure of cement articles, which are shaped by conventional methods such as wet paper forming, extrusion or casting with the reinforcing fibres abovementioned, are made relatively dense by high-pressure pressing or cured under various kinds of conditions in order to improve the strength of the cement articles. Curing can be done naturally, by steam, or by an autoclave. Natural curing requires a long curing time, longer than fourteen days. On the other hand, autoclave curing, which is conducted at a high temperature, hotter than 140° C., is advantageous in that curing lasts only twelve hours to eighteen hours normally.

Under alkaline conditions reinforcing fibres such as polyester fibres, vinyl fibres, polyamide fibres and acrylic fibres undergo chemical changes and become brittle when cured at the high temperatures abovementioned.

In addition, even alkaline-resistant glass fibres can become brittle when they are cured at the high temperatures abovementioned. Fibres which can withstand curing at high temperatures are heat-resistant alkaline polyolefin fibres such as poly 4-methyl pentene-1.

However, conventional polypropylene fibres are generally crystalline polypropylene having 96<HI<97 and 93<IPF<94 and normally having 5–6 g/d strength, HI being insoluble content of boiling normal-heptane in wt % and IPF being the isotactic pentad fraction in mol %. In addition, it is generally known that dry state fibre drawing which is conducted at about 150° C. with polypropylene having relatively low value of Q, about 4, is carried out in order to improve the drawing property of polypropylene. However, the polypropylene, which is drawn by the dry drawing practice, has strength of 7.5 g/d at maximum. As polypropylene is inferior in strength to other fibres, it is generally limited to being used as a reinforcing fibre for cement.

Polypropylene fibre which is made of a highly crystalline polypropylene fibre is disclosed in Patent Laid Open Sho (Tokkaisho) No.60-59113(1985), No.62-41331(1987). A problem exists in that the polypropylene fibres abovementioned have a low fibre breakage strength. In addition, in the past, highly crystalline polypropylene was mainly used in injection molding. And the polymer which possessed a wide molecular weight distribution, Q having a value of grater than 6, was put on the market in order to prevent heat contraction. The resin had a high value of Q and also had the same value of drawing orientation as conventional polypropylene. However, conventional polypropylene has been inferior to other synthetic fibres in strength. Recently, other synthetic fibres have been improved in strength remarkably. In comparison with the improved synthetic fibres abovementioned, the strength of conventional polypropylene has declined relatively. Improvement of strength of polypropylene fibres is required in the field of reinforcing short fibres for cement which primarily requires the strength. However, at present, the reinforcing short fibres for cement possessing the required property have not been obtained.

SUMMARY OF THE INVENTION

In order to solve the problems of the prior art above mentioned, this invention aims at obtaining extremely strong polypropylene fibre by using highly crystalline polypropylene having a specific molecular weight distribution and few low crystalline components and extremely high stereoregularity. This invention also aims at obtaining the strength of reinforcing fibre for use in cement shaped solid articles whose surfaces are treated with alkylphosphate salt and which are cured naturally or by autoclave especially, the reinforcing fibres for cement whose Charpy impact strength can be improved drastically.

To solve the subject matter abovementioned, a polypropylene fibre for reinforcing cement comprising a drawn thread of highly crystalline polypropylene having a fibre breakage strength of 6 g/denier or more and having Q<5, 97<HI<100, and 94 <IPF<100 wherein Q represents the ratio of weight-average molecular weight to number-average molecular weight, HI represents the insoluble content in boiling n-heptane in wt % and IPF represents the isotactic pentad fraction in mol %, said fibre comprising from 0.05 to 10% by weight of a hydrophilizing agent, which is insolubilized on the fibre surface by reacting with calcium ions.

It is preferable in this invention that the fibres possess a fibre breakage strength of 9 g/denier or more and made of highly crystalline polypropylene having $Q \leq 4.5$, $HI \geq 98$ and $IPF \geq 96$.

It is preferable in this invention that the hydrophilizing agent is an alkyphosphate alkaline metal salt with 8 to 18 carbon atoms.

It is preferable in this invention that fibre fineness is in a range of 0.5<d<20 (where d is denier).

It is preferable in this invention that fibre length ranges from 2 to 15 mm.

It is preferable in this invention that fibre length ranges between 5 and 10 mm.

It is preferable in this invention that a section of the fibre is substantially circular or an irregular, substantially X-shaped cross-section or an irregular, substantially Y-shaped cross-section.

It is preferable in this invention that the fibre is crimp formed crimping.

It is preferable in this invention that the fibre comprises fillers.

BRIEF DESCRIPTION OF THE DRAWINGS

An alkylphoshate alkaline metal salt was attached to the surface of the polypropylene fibre.

FIG. 1 (b) shows a cross sectional view polypropylene fibre shown in FIG. 1 (a).

FIG. 2 (b) shows a cross sectional view polypropylene fibre shown in FIG. 2 (a).

FIG. 3 (b) shows a cross sectional view polypropylene fibre shown in FIG. 3 (a).

FIG. 4 (b) shows a cross sectional view polypropylene fibre shown in FIG. 4 (a).

DETAILED DESCRIPTION OF THE INVENTION

Figure 1A:
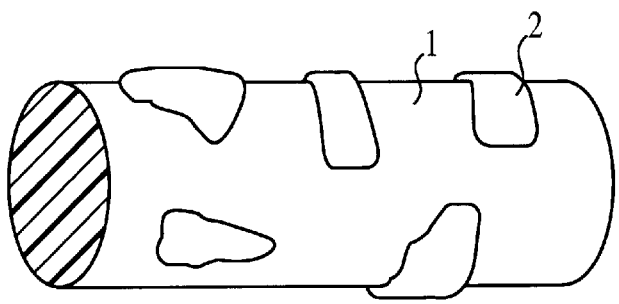
FIG. 1 (a) shows a typical polypropylene fibre which an alkylphoshate alkaline metal salt was attached to the surface of the fibre in a preferred embodiment of this invention.

According to the invention, the polypropylene fibres possess a high fibre breakage strength and good cement affinity is obtained. As polypropylene has a narrow molecular weight distribution, Q<5, and molecular weight is regulated, it can be extremely strengthened by drawing. As polypropylene has having 97<HI<100, 94<IPF<100, it has few low crystalline components and an extremely high stereoregularity and the orientation of polypropylene is improved in the drawing process. As a result, extremely strong polypropylene is obtained by the dry drawing method which draws the polypropylene at a high temperature (which does not make the anatomosis of the component) and at high drawing ratio. In addition, polypropylene is substantially a hydrophobic fibre and has a high chemical stability, and it can withstand the strong alkalinity of cement and also heat curing. For similar reasons, polypropylene dose not deteriorate over a long period of time. In addition, according to the invention, the strength of reinforcing fibres for cement shaped articles whose surface is treated with an alkylphosphate salt and naturally cured or cured in an an autoclave can be improved. In particular, the reinforcing fibre for cement, whose Charpy impact strength is also improved, can be obtained.

According to the invention, it was found that the stiffness of reinforcing fibre contributed to the strength of cement shaped articles greatly based on the conventional idea that the use of fibre having a high breakage strength as forcing fibre for cement can improve the strength of cement shaped articles. In order to realize the finding abovementioned, according to the invention, polypropylene fibre as a reinforcing fibre was highly crystallized in comparison with conventional polypropylene. In addition, in order to increase an affinity with cement shaped articles, an alkylphoshate alkaline metal salt was attached to the surface of the polypropylene fibre. The improvement of the surface of the fibre has an effect not only on affinity in mixing cement but also on the cement shaped articles. Therefore, the improvement of the surface of the fibre can maintain good strength for a long period by preventing separation between the surface of the fibre and the surface of the cement.

According to the invention, an extremely strong thread having few low crystalline components which prevents crystalline orientation during drawing, and having a higher insoluble content in boiling n-heptane in wt % than conventional polypropylene and having excellent stereoregularity by increasing the isotactic pentad fraction in mol % in comparison with conventional polypropylene and decreasing the value of Q (the ratio of weight-average molecular weight to number-average molecular weight) drastically in comparison with conventional highly crystalized polypropylene with an increased drawing ratio can be obtained.

According to the invention, it is a feature of the extremely strong polypropylene that it is made of the polypropylene which is highly orientation crystallized in comparison with conventional polypropylene. Preferably, the melt spinning temperature of the fibre is to be held relatively low in order to reduce the entanglement or cutting of molecules as in the conventional manner of making polypropylene. Preferably, the extremely strong polypropylene is to be drawn at a high drawing ratio at the highest possible temeperature to be highly orientation crystallized. According to the invention, polypropylene having more than 6 g/d of breakage strength can be obtained which could not be obtained by the large-scale production of conventional polypropylene as a single fibre. It is quite possible to obtain the polypropylene having breakage strength more than 9 g/d by preferable drawing condition abovementioned.

According to the invention, the extremely strong polypropylene fibre initially contains an agent, normal alkylphosphate alkaline salt, which has been made practically insoluble on the surface of the fibre by reacting with calcium ion. When the polypropylene is put in a cement slurry, the agent arrests the grains of cement around the agent and the agent becomes insoluble on the surface of the fibres. The mixture of the agent and the grains of cement cover and attach to the surface of fibre. As a result, the polypropylene fibre becomes hydrophilized and the hydrophilic property of the polypropylene fibre can be maintained.

Therefore, in stirring, air bubbles are not attached to the extremely strong polypropylene fibre and the fibre abovementioned is uniformly dispersed in the cement slurry. This prevents the fibre from floating and the polypropylene abovementioned is uniformly contained in the cement solid articles. As a result, the fibre is mixed homogeneously and the fixed effect of the reinforcing fibre can be obtained. In addition, according to the invention, it can improve high affinity and adhesiveness between a cement composition and the surface of the fibre. According to the invention, a drawn, highly crystalline polypropylene having Q<5, preferably Q≦4.5, 97<HI<100, and at having a high orientation, preferably 98<HI, 94<IPF<100, preferably, 95≦IPF is used. And the melt fluidity of the polypropylene is in a range of 1<MFR<100, preferably, 5<MFR<30 and most preferably 10<MFR<20. (MFR:the melt flow range: g/ten minutes, JIS-K-7210, load 2,169 kg, measured temperature 230° C.) The density of polypropylene is about 0.905 in the raw material pellet state which is the same value as conventional polypropylene. Furthermore, IPF is measured with regard to the n-heptane insoluble component, according to Macromoleculer, Vol. 6,925 (1973) or Vol.8,687 (1975).

The melt spinning temperature of the fibre is to be held relatively low in order to reduce entangling or folding of molecules within the range of temperature in which the stereoregularity is not damaged. Said temperature is preferably in a range of 260° to 280° C. The fibre is drawn in a hot roll dry process preferably at 140° C. to 150° C. to improve the drawing performance as far as possible. Preferably, the fibre is drawn into a toe for production. After drawing the polypropylene, according to the invention, the oil agent containing alkylphosphate alkaine metal salt is conferred to the polypropylene and is cut in fixed length. Before cutting, a crimp may be conferred to the polypropylene, if it is necessary. When crimping the fibres, it is preferable to crimp using a stuffing box, for example, two and a half or three times per one cut fibre.

The measured examples of respective factors which are defined in the invention will be explained.

(1) The ratio of weight average molecular weight is measured, for example, by using the light scattering method, viscosity method, ultracentrifuge method, in the formula $$Mw=[\Sigma NiMi^2]/[\Sigma NiMi]$$

(2) The number-average molecular weight is measured, for example, by using the end group determination method, freezing point lowering method or osmotic pressure method, in the formula $$Mn=[\Sigma NiMi]/[\Sigma Ni]$$

Generally, the ratio of weight-average molecular weight/number-average molecular weight is used as the scale for the degree of multiple dispersions, and when this value is greater than 1 (single dispersion), the molecular weight distribution curve becomes broader. The value is also higher in the polymer branched in multiplicity.

In the following example, Q was measured using gel permeation chromatography (GPC).

(a) Measuring machine: ALC/GPC TYPE 150c, Waters Laboratory Co.)
(b) Column: TSK-GER GMH6-HT (high temperature type)
(c) Solvent: orthodochlorobenzene (ODCB)
(d) Temperature: 135° C.
(e) Detector: differential thermal refractometer
(f) Volume of flowing solvent:1 ml/min.

Under the above conditions, a sample of highly crystalline polypropylene yielded the following results:

TABLE 1

| Polymer | Mn | Mw | Q(Mw/Mn) | MFR(g/10 min.) |
|---|---|---|---|---|
| Highly crystalline-polypropylene | 40,000 | 140,000 | 3.5 | 1.5 |

Where:

Mw; the weight-average molecular weight,
Mn; the number-average molecular weight,
Q; the ratio Mw/Mn,
MFR; the melt flow range.

(3) HI or the normal heptane insoluble matter is measured by fully dissolving 5 g of a polypropoylene sample in 500 ml of boiling xylene, charging the mixture into 5 liters of methanol to recover the precipitate, drying it and extracting in boiling n-heptane for 6 hours according to the Soxhlet process to obtain an extraction residue. HI is measured with regard to the n-heptane insoluble component, according to Macromolecular Handbook, editing of Japan Chemical Analysis Society, Asakura-shoten, page 253, (1980).

(4) IPF or the isotactic pentad fraction is measured in the n-heptane insoluble matter, according to the method proposed in "Macromoleculer", vol. 6, 925 (1973) and vol. 8,697 (1975).

(5) The melt flow range (MFR) is measured at 230° C. by the nozzle passing rate (unit:g/10 min, JIS K7210, load 2,169 kg)

According to the invention, the fibres can be cut in a non-uniform length in a range of from 2 to 15 mm, preferably the fibre length ranges between 5 to 10 mm. The fibre section may be circular or of an irregular shape such as X or Y shape.

An alkylphosphate salt is a monoalkylester or dialkylester with 8 to 18 carbon atoms. Preferably, a sodium or potassium salt is used. In addition to the abovementioned alkylphosphate salt such as a monoalkylester or dialkylester, an alkaline salt, an alkaline earth salt, other metals which are not insoluble can be used. A calcium salt is insoluble and a solution of calcium salt can be obtained. Thus, calcium salt is not attached to the surface of the fibres. Normal alkyl groups and denatured alkyl groups can be used. For example, an alkyl group which has several divergences or an alkyl group which comprises a polarizable linkage except for a carbon-carbon linkage such as an ether linkage or an alkyl group which comprises a polarizable linkage group in chain portion can be used. Further, a hydrophilic akyl group is not preferable as a hydrophilic alkyl group prevents the insolubility of the abovementioned formed compound.

If the content of the alkylphosphate alkaline metal salt is less than 0.05 wt %, the dispersion of the fibre is insufficient but if it exceeds 10 wt %, the effect of same is not improved.

Figure 1B:
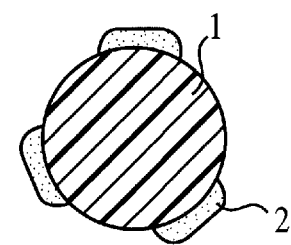
Figure 2A:
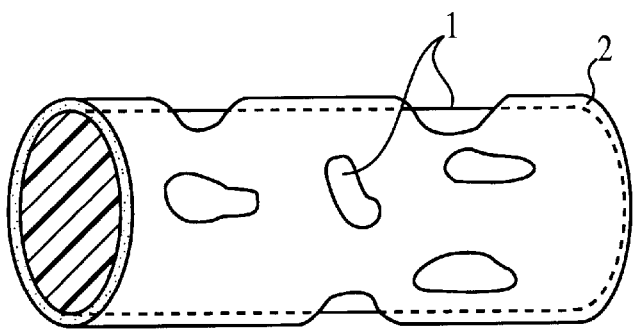
FIG. 2 (a) shows a typical polypropylene fibre which an alkylphoshate alkaline metal salt was attached to the surface of the fibre in a preferred embodiment of this invention.
Figure 2B:
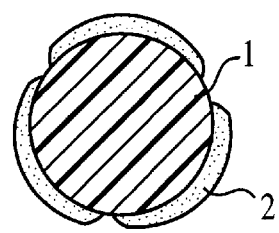
Figure 3A:
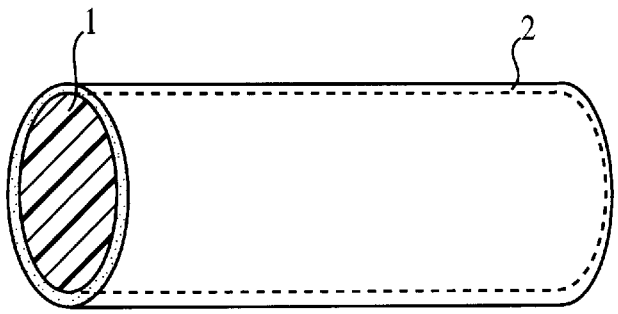
FIG. 3 (a) shows a typical polypropylene fibre which an alkylphoshate alkaline metal salt was attached to the surface of the fibre in a preferred embodiment of this invention.
Figure 3B:
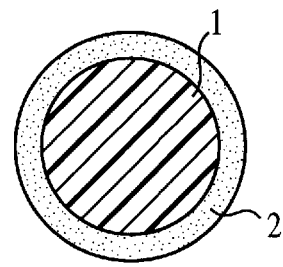
Figure 4A:
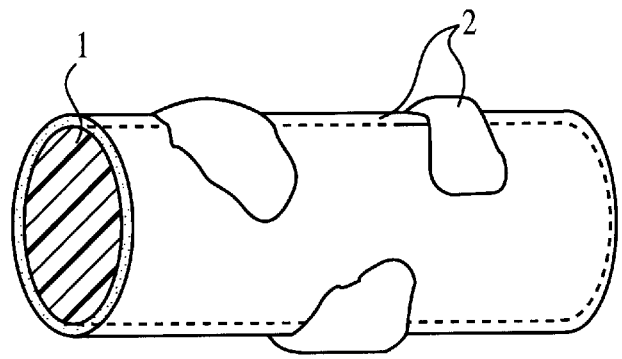
FIG. 4 (a) shows a typical polypropylene fibre which an alkylphoshate alkaline metal salt was attached to the surface of the fibre in a preferred embodiment of this invention.
Figure 4B:
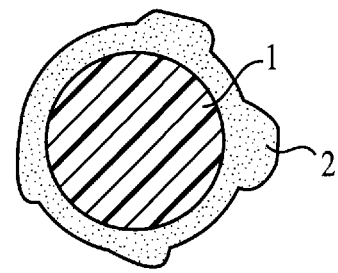
Figure 5A:
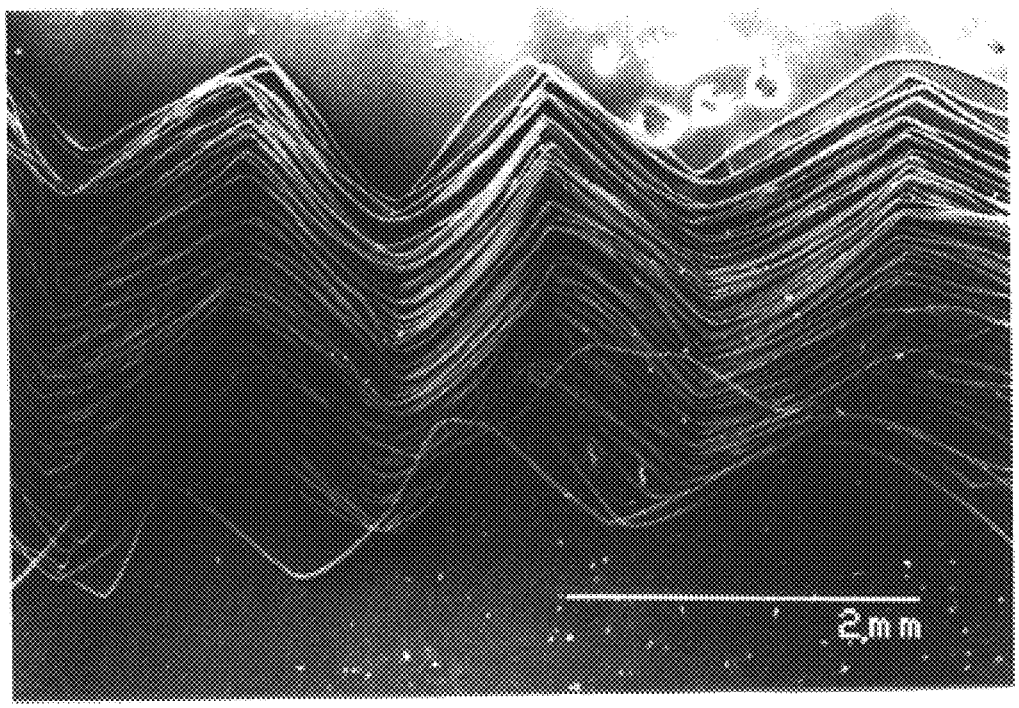
FIG. 5 (a) and 5 (b) are photographs showing a fibre in the shape of a crimp.
Figure 5B:
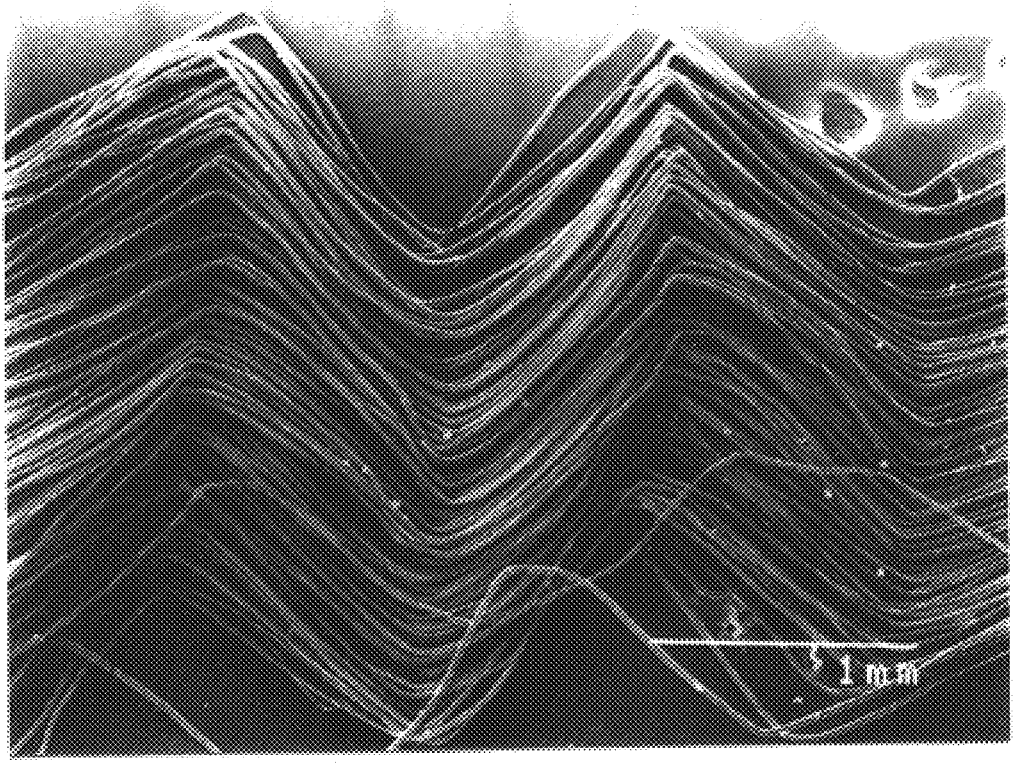

FIGS. 1 (*a*) and (*b*) show a typical polypropylene fibre 1 which a partially a n-alkylphoshate alkaline metal salt 2 was attached to the surface of the fibre in a preferred embodiment of this invention. FIGS. 2 (*a*) and (*b*) show a typical polypropylene fibre 1 which a small amount of a n-alkylphoshate alkaline metal salt 2 was attached to the surface of the fibre in a preferred embodiment of this invention. FIGS. 3 (*a*) and (*b*) show a typical polypropylene fibre 1 which a n-alkylphoshate alkaline metal salt 2 was attached uniformity to the surface of the fibre in a preferred embodiment of this invention. FIGS. 4 (*a*) and (*b*) show a typical polypropylene fibre 1 which a more large amount of a n-alkylphoshate alkaline metal salt 2 was attached to the surface of the fibre in a preferred embodiment of this invention.

The polypropylene fibres are added in the amount of 0.3% to 5 wt % with respect to the dry cement matrix. When the fibre content is less than 0.3 wt %, the reinforcing effect is not obtained and when it exceeds 5 wt %, the bending strength of the composite is suddenly lowered.

The invention will be described hereinbelow in a more detailed way.

EXAMPLES 1 TO 10, COMPARATIVE EXAMPLES 1 TO 9

310 kg of polypropylene resin pellets shown in Table 2 were melt and spun at 275° C. (the hottest temperature of the extruder) for 24 consective hours, substantially, a single fibre having a circular section was melt and spun to 7 denier of single fibre fineness, 3000 Denier of total fibre fineness having an undrawn toe was obtained. A bundle of the toe abovementioned which were gathered in 25 cans was drawn in a hot roll dry process at 150° C. by a factor of 3.5. Thus, the polypropylene fibre having a single fineness of 2 denier was obtained. The obtained polypropylene fibre was impregnated using a surfactant, normal alkylphosphate metal salt, allowed to stand overnight and dried in air, and was cut in 6 mm or 10 mm. Before it was cut, the degree of strength of the dried drawn thread was measured.

8 liter of cement slurry was made by mixing 680 g of regular Portland cement, 17 g of pulp, 170 g of inorganic fibre, 8.5 g of the short fibres described above with 7.2 liter of water. (In example 5 and comparative example 9, 13 g of short fibres were used and in comparative example 3, 2.6 g of fibres were used. In comparative example 8, 8.5 g of vinylon fibre for reinforcement having 2 denier and a length of 6 mm in comparative example 9, 13 g of vinylon fibre for reinforcement having 2 denier and length of 6 mm, and in comparative example 7, 43 g of asbesto were used. Further, 20 ml of flocculating agent was added to the cement slurry. (Trademark:IK-Flock, Ichikawa Keori Co.) The cement slurry abovementioned was poured into 8 mold container having a 250 mm×250 mm based area. The cement slurry abovementioned was dewatered by passing through a wire gauze having a 60 mesh, paper like from and the residue was layered, one after another, in eight layers by placing the top side upward. Thus, semi-plastic shaped articles having a thickness of about 8 mm in slate state was obtained. The semi-plastic shaped article abovementioned was pressed at 200 kg/cm$^2$ for one minute and the pressured shaped article was left in the wet state at room temperature for 28 days and naturally cured. The slurry state of the pressured shaped articles and the products were valued.

The results are given in the Table 2 and 3 herebelow.

TABLE 2

| Example No. | 1 | 2 | 3 | 4 | 5 | 6 | 7 | 8 | 9 | 10 |
|---|---|---|---|---|---|---|---|---|---|---|
| Polypropylene | | | | | | | | | | |
| The value of Q | 3.5 | 3.5 | 3.5 | 3.5 | 3.5 | 3.5 | 3.5 | 3.5 | 3.5 | 3.5 |
| HI (%) | 98 | 98 | 98 | 98 | 98 | 98 | 98 | 98 | 98 | 98 |
| IPF (%) | 97 | 97 | 97 | 97 | 97 | 97 | 97 | 97 | 97 | 97 |
| MFR (g/10 minutes) | 15 | 15 | 15 | 15 | 15 | 15 | 15 | 15 | 15 | 15 |
| The melting point (° C.) | 165 | 165 | 165 | 165 | 165 | 165 | 165 | 165 | 165 | 165 |
| The ratio of drawing (times) | 4.5 | 4.5 | 4.5 | 4.5 | 4.5 | 4.5 | 4.5 | 3.7 | 4.0 | 4.1 |
| The performance of fibre | | | | | | | | | | |
| denier (d) | 1.9 | 1.9 | 1.9 | 1.9 | 1.9 | 1.9 | 1.9 | 2.1 | 1.9 | 5.0 |
| The breakage strength (g/d) | 9.4 | 9.4 | 9.4 | 9.4 | 9.4 | 9.4 | 9.4 | 6.5 | 7.9 | 8.5 |
| The breakage extension (%) | 25 | 25 | 25 | 25 | 25 | 25 | 25 | 47 | 31 | 40 |
| Surface active agent | | | | | | | | | | |
| Type | A | A | A | A | A | B | C | A | A | A |
| The quantity of adhension (%) | 0.5 | 0.5 | 0.8 | 3.0 | 0.5 | 0.5 | 0.5 | 0.5 | 0.5 | 0.5 |
| Length of fibre (mm) | 6 | 10 | 6 | 6 | 6 | 6 | 6 | 6 | 6 | 6 |
| The ratio of floating fibre (%) | 0 | 0 | 0 | 0 | 0 | 0 | 0 | 0 | 0 | 0 |
| The dispersion capability | ⊚ | ⊚ | ⊚ | ⊚ | ⊚ | ⊚ | ⊚ | ⊚ | ⊚ | ⊚ |
| The surface appearance | ⊚ | ⊚ | ⊚ | ⊚ | ⊚ | ⊚ | ⊚ | ⊚ | ⊚ | ⊚ |
| The bending strength (Kg/cm$^2$) | 190 | 190 | 190 | 190 | 190 | 190 | 190 | 190 | 190 | 180 |
| The Charpy impact strength (Kg-cm/cm$^2$) | 3.7 | 3.7 | 3.7 | 3.6 | 6.5 | 3.6 | 3.6 | 3.4 | 3.5 | 3.6 |

TABLE 3

| Comparative Example No. | 1 | 2 | 3 | 4 | 5 | 6 | 7 | 8 | 9 |
|---|---|---|---|---|---|---|---|---|---|
| Polypropylene | | | | | | | (*1) | (*2) | (*3) |
| The value of Q | 3.5 | 3.5 | 3.5 | 4.0 | 4.0 | 4.0 | — | — | — |
| HI (%) | 98 | 98 | 98 | 97 | 97 | 97 | — | — | — |
| IPF (%) | 97 | 97 | 97 | 94 | 94 | 94 | — | — | — |
| MFR (g/10 minutes) | 15 | 15 | 15 | 15 | 15 | 15 | — | — | — |
| The melting point (° C.) | 165 | 165 | 165 | 163 | 163 | 163 | — | — | — |
| The ratio of drawing (times) | 4.5 | 4.5 | 4.5 | 4.3 | 4.3 | 4.3 | — | — | — |
| The performance of fibre | | | | | | | | | |
| denier (d) | 1.9 | 1.9 | 1.9 | 1.9 | 1.9 | 1.9 | — | 2.1 | 2.1 |
| The breakage strength (g/d) | 9.4 | 9.4 | 9.4 | 6.0 | 6.8 | 7.8 | — | 9.0 | 9.0 |
| The breakage extension (%) | 25 | 25 | 25 | 34 | 29 | 25 | — | — | — |
| Surface active agent | | | | | | | | | |
| Type | D | A | A | A | A | A | non | non | non |
| The quantity of adhension (%) | 3.0 | 0.03 | 0.5 | 0.5 | 0.5 | 0.5 | — | — | — |
| Length of fibre (mm) | 6 | 6 | 6 | 6 | 6 | 6 | — | 6 | 6 |
| The ratio of floating fibre (%) | 20 | 12 | 0 | 0 | 0 | 0 | 0 | 0 | 0 |
| The dispersion capability | x | Δ | ⊚ | ⊚ | ⊚ | ⊚ | ⊚ | ⊚ | ⊚ |
| The surface appearance | x | ○ | ⊚ | ⊚ | ⊚ | ⊚ | ⊚ | ⊚ | ⊚ |
| The bending strength (Kg/cm$^2$) | 170 | 175 | 175 | 175 | 175 | 180 | 180 | 190 | 180 |
| The Charpy impact strength (Kg-cm/cm$^2$) | 2.8 | 2.7 | 2.6 | 2.6 | 3.0 | 3.2 | 1.7 | 2.5 | 3.3 |

(*1): Added asbestos 43 grams.
(*2): Added vinylon fibres (2 denier, 6 mm length) 8.5 grams.
(*3): Added vinylon fibres (2 denier, 6 mm length) 13 grams.

In the evaluation, the ratio of floating fibres was measured as follows: The prepared cement slurry was placed in a static condition for ten minutes and the floating fibre in the clear layer at the top of the cement slurry was scooped up by a wire gauze and the weight of the fibre A was measured. The ratio of floating fibre was calculated by the formula, 100 A/B (weight of fibre which was put into cement slurry).

The dispersion capability was evaluated by observing unevenness of the surface of the semi-plastic shaped articles which were obtained by dewatering the slurry after the slurry was poured into the mold container.

⊚ represents an excellent quality surface of the semi-plastic shaped articles with respect to evenness.

○ represents a good quality surface of the semi-plastic shaped articles with respect to evenness.

Δ represents a fair quality surface of the semi-plastic shaped articles with respect to evenness.

X represents a poor quality expresses the state that the surface of the semi-plastic shaped articles with respect to evenness.

The appearance of the product was evaluated by observing the outside and the inside of the cement product after it was cured.

⊚ represents an excellent quality surface of the product with respect to fibre exposure.

○ represents a good quality surface of the product with respect to fibre exposure.

Δ represents a fair quality surface of the product with respect to fibre exposure.

X represents a poor quality surface of the product with respect to fibre exposure.

The bending strength was measured according to JIS-A-1408.

The Charpy impact strength was measured according to JIS-B-7722.

The examples and the comparative examples shown in FIG. 2 and FIG. 3 comprise 8.5 g of polypropylene fibre of the invention in 8 liter of the cement slurry. However, in the example 5, 13 g of the polypropylene fibre was comprised in the cement slurry, and in the comparative example 9, 2.6 g of the polypropylene fibre was comprised in the cement slurry. In the comparative example 7, 43 g of asbestos, in the comparative example 8, 8.5 g of vinyl fibre, in the comparative example 9, 13 g of vinylon fibre was comprised in the cement slurry. In FIG. 2 and FIG. 3, surface active agents were described as follows:

A: Laurylphosphatepotassium
B: Decylphosphatepotassium
C: Tridecylphosphatepotassium
D: Polyoxyethylenephenolether Apparently, as shown in Table 2 and Table 3, the examples 1 to 10 satisfied the conditions of the invention and had satisfactory results such as the fibre dispersion capability, the surface appearance, the bending strength and the Charpy impact strength. In comparison with the examples abovementioned, in comparative example 1, polyoxyethylenephenolether adhered to the surface of the fibre as a surface active agent and as a result, the ratio of foating fibre was high. Thus, the fibre dispersion capability, the surface appearance, the bending strength and the Charpy impact strength were unsatisfactory. In the comparative example 2, the fibre dispersion capability was unsatisfactory and the Charpy impact strength was poor as the adhered quantity of the surface active agent was poor and the ratio of floating fibre was high. In comparison example 3, the Charpy impact strength was poor as the quantity of fibre which was put into the cement slurry was very low. In comparative examples 4, 5 and 6, conventional polypropylene fibre was used and both the bending strength and the Charpy impact strength were poor. In comparative examples 7, 8 and 9, conventional reinforced fibre was used and the Charpy impact strength was unsatisfactory.

EXAMPLES 11 AND 12, COMPARATIVE EXAMPLES 10 TO 15

The pressed semi-plastic shaped article, made by the same procedure of example 1, and the semi-plastic shaped article made by wet paper like forming, thickness of 5 mm, were autoclave cured at 160° C. for 18 hours and then evaluated. The result of the evaluation is described in Table 4.

TABLE 4

|  | Example No. | | Comparative example No. | | | | | |
| --- | --- | --- | --- | --- | --- | --- | --- | --- |
|  | 11 | 12 | 10 | 11 | 12 | 13 | 14 | 15 |
| The semi-plastic | | | | Comparative Ex. | | | | |
| shaped article | Ex.1 | Ex.1 | 6 | 6 | 7 | 7 | 8 | 8 |
| Molded by press | ○ | non | ○ | non | ○ | non | ○ | non |
| The bending strength (Kg/cm²) | 200 | 150 | 190 | 110 | 180 | 100 | (*4) | (*4) |
| The Charpy impact strength (Kg-cm/cm²) | 4.2 | 3.5 | 3.5 | 3.0 | 1.8 | 2.0 | (*4) | (*4) |

(*4): Fibres were eliminated by decomposition.

Apparently, as shown in Table 4, examples 11 and 12 had satisfactory results such as the bending strength and the Charpy impact strength. Especially, example 11 in which the substrate was molded by pressing had a more satisfactory result. The results of comparative examples 10 to 15 were not so satisfactory compared to those of the examples abovementioned. The substrates of the comparative examples 10 to 15 were molded by pressing.

EXAMPLES 13 AND 14, COMPARATIVE EXAMPLES 16 TO 19

8 liter of cement slurry was made by mixing 510 g of regular Portland cement, 340 g of silica sand, 17 g of pulp and 8.5 g of the fibre of comparative examples 6 and 8 with 7.2 liter of water. Further, 0.02 wt % of 20 ml of flocculating agent was added to the cement slurry. The cement slurry abovementioned was poured into 10 mold containers. The cement slurry abovementioned was dewatered by passing through a wire gauze having 60 mesh. Thus, semi-plastic shaped articles having a thickness of about 5 mm was obtained. The shaped article abovementioned was cured naturally cure (C-1), being left in a wet state for 28 days, and then autoclave cured (C-2), being left at 160° C. for ten hours. The products of the shaped articles were evaluated. The results are shown in Table 5.

TABLE 5

| | Example No. | | Comparative example No. | | | |
|---|---|---|---|---|---|---|
| | 13 | 14 | 16 | 17 | 18 | 19 |
| | | | Comparative Ex. | | | |
| Semi-plastic shaped article | Ex. 1 | Ex. 1 | 6 | 6 | 8 | 8 |
| Cure method | C-1 | C-2 | C-1 | C-2 | C-1 | C-2 |
| Bending strength (Kg/cm$^2$) | 105 | 105 | 105 | 115 | 121 | (*5) |
| Charpy impact strength (Kg-cm/cm$^2$) | 6.7 | 5.8 | 2.9 | 2.8 | 2.8 | (*5) |

(*5): Fibers were eliminated by decomposition.

Apparently, as shown in Table 5, examples 13 and 14 had satisfactory results demonstrated by bending strength and Charpy impact strength. The results of comparative examples 16 to 19, both naturally cured and autoclave cured, were not as satisfactory as those of the examples in the invention.

EXAMPLES 15 AND 16, COMPARATIVE EXAMPLE 20

Polymers having different kinds of polypropylene fibre were used and the results were compared. The value of Q was measured according to the conditions abovementioned. The number-average molucular weight, the weight-average molecular weight, the value of Q and MFR of the polymers of examples 15 and 16, and the comparative example 20 are shown in Table 6.

The cement shaped articles were manufactured using the same procedure as in example 14. The result is shown in Table 6.

TABLE 6

| Example No. | 15 | 16 | Com.Ex.20 |
|---|---|---|---|
| Polypropylene | | | |
| The value of Q | 3.5 | 4.5 | 6.0 |
| HI (%) | 98 | 98 | 98 |
| IPF (%) | 97 | 97 | 97 |
| MFR (g/10 minutes) | 15 | 15 | 15 |
| The melting point (°C.) | 165 | 165 | 165 |
| The ratio of drawing (times) | 4.5 | 4.3 | 3.7 |
| The performance of fiber | | | |
| denier (d) | 1.9 | 1.9 | 1.9 |
| The breakge strength (g/d) | 9.4 | 8.5 | 6.5 |
| The breakage extension (%) | 25 | 30 | 45 |
| Surface active agent | | | |
| Type | A | A | A |
| The quantity of adhension (%) | 0.5 | 0.5 | 0.5 |
| Length of fiber (mm) | 6 | 6 | 6 |
| The ratio of floating fiber (%) | 0 | 0 | 0 |
| The dispersion capability | ⊚ | ⊚ | ⊚ |
| The surface appearance | ⊚ | ⊚ | ⊚ |
| The bending strength (Kg/cm$^2$) | 190 | 180 | 175 |
| The Charpy impact strength(Kg-cm/cm$^2$) | 3.7 | 3.5 | 3.0 |

A shown in Table 6, the polypropylene fibre of the invention had an excellent character, Q<5. According to the invention, the polypropylene fibre in the examples were beneficial for use in a reinforcing cement, as the polypropylene fibre was preferably dispersed, mixing well with the cement slurry. Even the polypropylene fibre alone was highly hydrophobic and the specific gravity of the polypropylene fibre was low. Especially, in the manufacturing process of the cement shaped articles by the wet paper forming method, the reinforcing effect was shown as the polypropylene fibre did not float and the product had an excellent surface appearance and the input fibre was uniformly dispersed. The polypropylene fibre of the invention was stronger than conventional polypropylene fibre for reinforcing. Thus the polypropylene fibre of the invention was excellent in bending strength and impact strength. Fibre for reinforcing cement was obtained by utilizing the character of alkalinity-resistance and providing a dispersion in the cement slurry for an extremely strong and highly crystalline polypropylene fibre having greater than 6 g/denier breakage strength and excellent stiffness. Thus, the cement shaped article having an excellent bending strength and Charpy impact strength is obtained.

The bending strength and impact strength of the cement shaped articles are not necessarily high if the breakage strenth of the reinforcing fibre is high. In comparing example 8 and comparative example 6, the breakage strength of the fibre of example 8 was 6.5 g/d, that of comparative example 5 was 6.8 g/d, that of comparative example 6 was 7.8 g/d. As shown in the comparison abovementioned, the breakage strength of the comparative examples was much stronger than that of the example. However, the bending strength and Charpy impact strength of the cement shaped article which was reinforced by the relatively strong conventional polypropylene fibre of the comparative examples were inferior to those of the example 8. It was assumed that the result abovementioned was due to the excellent stiffness of the highly crystalline polypropylene of the invention.

According to the invention, the polypropylene fibre having high breakage strength and an excellent affinity with cement can be obtained. The polypropylene fibre can be extremely strengthened by drawing, as the polypropylene fibre has a narrow molecular weight distribution, Q<5 and the molecular weight is regulated. In addition, the orientation of the polypropylene fibre during drawing can be improved as the polypropylene fibre has few low crystalline components and extremely high stereoregularity. As a result, the extremely strong polyprpylene fibre can be obtained by a dry drawing process which draws the polypropylene fibre at a high temperature (wherein the anastomosis of the component is not made) and at high drawing ratio. In addition, substantially, polypropylene is a hydrophobic fibre and has a high chemical stability and it can stand the strong alkalinity of cement and also heating curing.

For similar reasons, the property of the polypropylene fibre dose not deteriorate over a long period of time. In addition, according to the invention, the strength of the reinforcing cement shaped article, whose surface is treated with alkylphosphate salt and cured naturally by or autoclave, can be improved. The reinforcing fibre for cement whose Charpy impact strength is improved, can be obtained.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. A polypropylene fibre for reinforcing cement comprising a drawn fibre of highly crystalline polypropylene having a fibre breakage strength of at least 6 g/denier and having Q<5, 97<HI<100, and 94<IPF<100, wherein Q represents the ratio of weight-average molecular weight to number-average molecular weight, HI represents the insoluble content of boiling n-heptane in wt % and IPF represents the isotactic pentad fraction in mol %, said fibre comprising from 0.05 to 10% by weight of a hydrophilizing agent, which is insolubilized on the fibre surface by reacting with calcium ions.

2. The polypropylene fibre for reinforcing cement according to claim 1, wherein the fibres possess a fibre breakage strength of 9 g/denier or more and are made of highly crystalline polypropylene having $Q \leq 4.5$, $HI \geq 98$ and $IPF \geq 96$.

3. The polypropylene fibre for reinforcing cement according to claim 1, wherein said hydrophilizing agent is an alkylphosphate alkaline metal salt with 8 to 18 carbon atoms.

4. The polypropylene fibre for reinforcing cement according to claim 1, wherein said fibres have a fibre fineness in a range of 0.5<d<20, where d represents denier.

5. The polypropylene fibre for reinforcing cement according to claim 1, wherein said fibre length ranges from 2 to 15 mm.

6. The polypropylene fibre for reinforcing cement according to claim 1, wherein said fibre length ranges between 5 and 10 mm.

7. The polypropylene fibre for reinforcing cement according to claim 1, wherein a section of the fibre is substantially circular, substantially X-shaped cross-section, or substantially Y-shaped cross-section.

8. The polypropylene fiber for reinforcing cement according to claim 1, wherein said fiber is crimped.

9. The polypropylene fiber for reinforcing cement according to claim 1, wherein said fiber further comprises fillers.

* * * * *